A. C. SMITH.
WAGON STEP.
APPLICATION FILED MAY 9, 1914.
1,141,017.
Patented May 25, 1915.
2 SHEETS—SHEET 1.
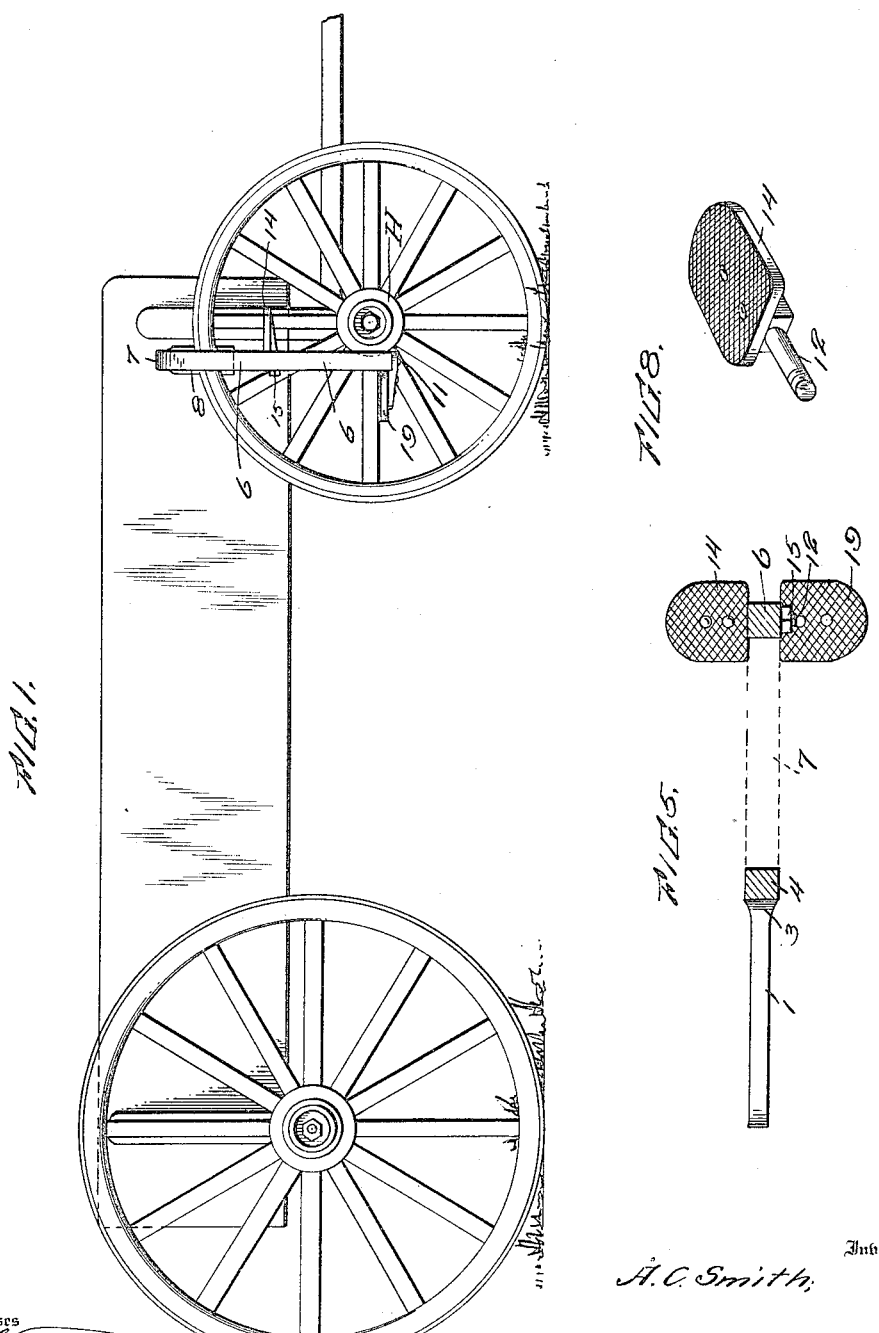

A. C. SMITH.
WAGON STEP.
APPLICATION FILED MAY 9, 1914.
1,141,017.
Patented May 25, 1915.
2 SHEETS—SHEET 2.
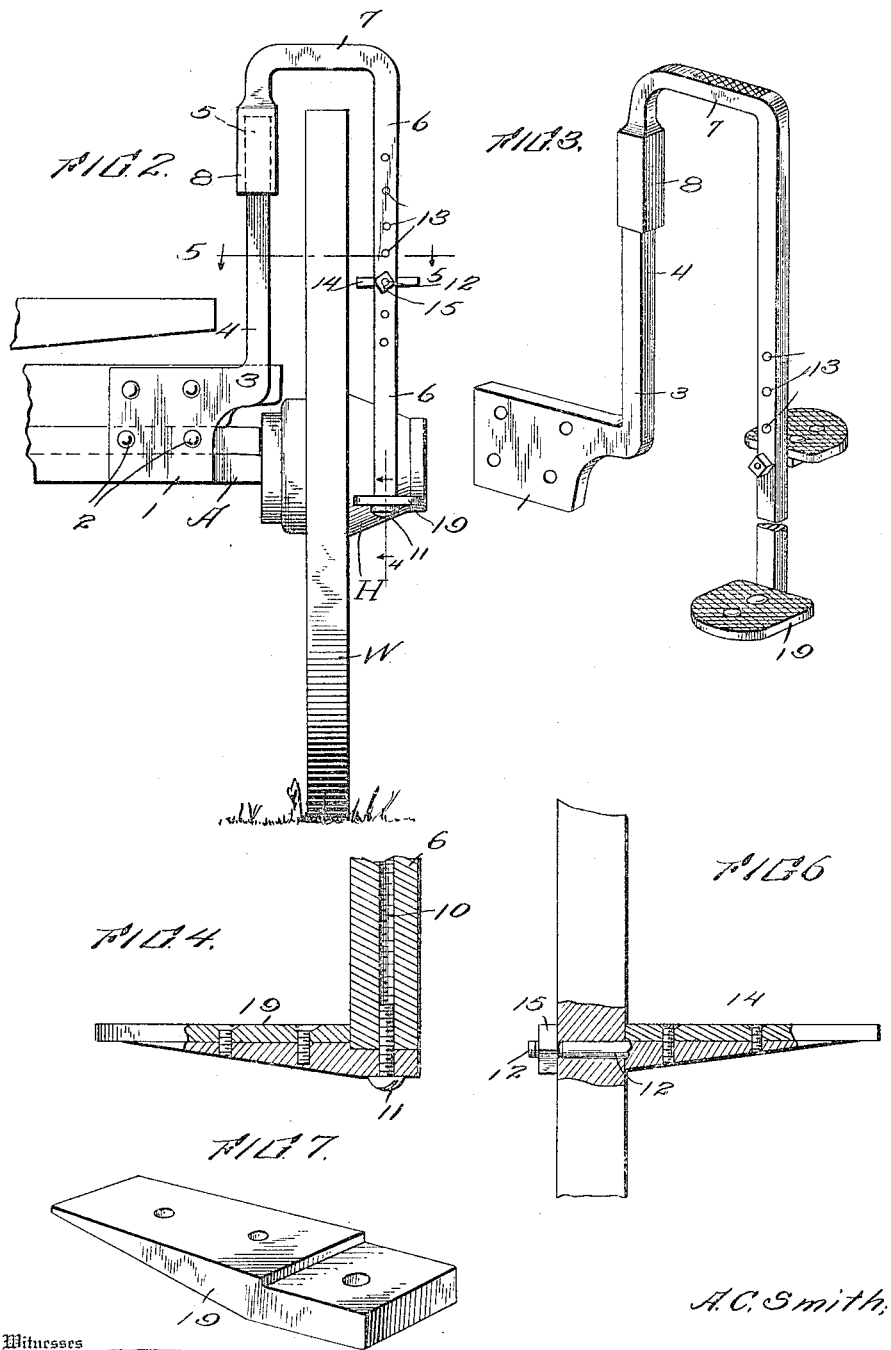

UNITED STATES PATENT OFFICE.

AMON CORNELIUS SMITH, OF CLARENDON, TEXAS.

WAGON-STEP.

1,141,017. Specification of Letters Patent. Patented May 25, 1915.

Application filed May 9, 1914. Serial No. 837,553.

*To all whom it may concern:*

Be it known that I, AMON CORNELIUS SMITH, citizen of the United States, residing at Clarendon, in the county of Donley and State of Texas, have invented certain new and useful Improvements in Wagon-Steps; and I do hereby declare the following to be a full, clear, and exact description of the invention, such as will enable others skilled in the art to which it appertains to make and use the same.

This invention relates to farm wagons, and more especially to steps; and the object of the same is to produce improved steps mounted removably over the front wheel and in rear of the hub of a farm wagon and supported by the axle and sand board, and to provide an easy, safe and cleanly means of reaching the spring seat over the wheel, the same being referred to in the specification.

An important feature of the present invention lies in the adaptation of the device as an attachment applicable either to the right or the left end of the axle and sand board as well as to large or small wheels.

Details of the invention are amplified in the following specification, reference being had to the drawings wherein—

Figure 1 is a side elevation of an ordinary wagon showing my improved step in place. Fig. 2 an enlarged rear elevation of the step structure mounted over the front wheel, part of the axle being shown. Fig. 3 is a perspective detail of the parts of the step structure assembled. Fig. 4 is a vertical section of the lower end of the outer member and the lower foot piece. Fig. 5 is a horizontal section on the line 5—5 of Fig. 2 with the wheel omitted. Fig. 6 is a vertical section through the upper foot piece and a portion of the outer member. Fig. 7 is a perspective detail of the support for the lower foot piece. Fig. 8 is a perspective detail of the upper foot piece.

In the drawings the letter A designates an axle on whose spindle is mounted a wheel W having the usual hub H. When these are parts of an ordinary farm or box wagon, the seat is generally mounted on the body or box, and in order to gain access to it the driver or a passenger will usually climb over the front wheel by stepping first on its hub and then on its tire at the top. This practice is dangerous because in doing so one's foot might slip or the team might start, and it is dirty because of the grease on the hub and the dust or mud on the wheel. Ordinarily wagons of this kind are not provided with steps, but in case the owner uses his wagon frequently for the purpose of carrying passengers the need arises for an attachment which will permit them to step over the wheel in getting in and out and yet which can be removed when the wheel is to be taken off for greasing the axle or repairing the parts. I may say at this point that I propose to construct this step structure as an attachment capable of application to the axle and sand board of an ordinary farm wagon, and made originally in a size which will pass over the largest wheel generally used on such wagons, but capable of being cut down by the purchaser to even the smallest size of wheel.

Coming now to the details of the invention, the number 1 designates a plate of any suitable type, preferably secured to the axle A by bolts or screws 2, and this plate has an arm 3 projecting rigidly outward along the rear side of and above the axle and over the inner end of the hub, as best seen in Fig. 2, thence turning upward into what we might call a finger 4 standing just inside the wheel W, and made square or angular at its upper end as at 5.

The number 6 designates an L-shaped member whose foot 7 stands at the top and has a dependent toe formed in the shape of a socket 8 whose bore is square or angular so as to removably fit over the square upper end 5 of the finger 4. From the closed upper end of this socket the foot 7 projects outward over the top of the wheel W, and the body of the member 6 depends along the outside of said wheel just in rear of its horizontal center, so that its lower end passes behind hub H as best seen in Fig. 1. The lower extremity of the member 6 terminates about one inch above the lower line of the hub as shown, and the entire outer side of the member 6 stands on a line inside the outer end of the hub as seen in Fig. 2. Said member 6 carries a number of foot pieces whereof two are shown herein, one numbered 19 projecting to the rear from the lower end of the member and therefore standing behind the hub and ordinarily about nineteen inches above the ground, and the other numbered 14 standing about fourteen inches above the first and projecting forward from said member over the hub. These foot pieces and the top or foot of the member 6 may be corrugated or otherwise roughened to prevent the foot from slipping off the same, and the foot pieces will preferably be made detachable and adjustable. My preferred means of carrying this out is to provide a rather long threaded hole 10 in the lower end of the member 6 and secure the lower step 19 to such member by a screw 11 passing upward through the step into said hole, so that, however much is cut off the lower end of the member, there will remain enough of the hole to receive the screw.

The other step 14 may well have a threaded pin or bolt 12 projecting from its support and adapted to pass through any one of a series of holes 13 formed in said member 6, a nut 15 being screwed on the opposite end as shown. These two means for securing the foot pieces to said member permit their attachment to it at the desired heights as the wishes of the user and the size of the wheel may require, they permit the use of the attachment at the other end of the axle because the position of the foot pieces would then be reversed from that shown in Fig. 3, and of course they permit the removal of the foot pieces so that the device can be packed in small compass at the time it is put on the market. Any other equivalent means having the same possibilities might be employed.

I consider it essential that the body of the member 6 shall stand inside a line drawn through the outer end of the hub parallel with the wheel, that its lower end shall stand above the lower line of the hub and its body behind the same, and that the upper or forward foot piece 14 shall be shorter than the diameter of the hub so that its front end stops short of an upright line through the front side of the hub, whereas the lower foot piece 19 may be longer, if desired. It is quite clear that if the wheel W is small enough one foot piece can be omitted and in that case I would by preference omit the uppermost for obvious reasons.

While I have shown the socket 8 as depending from the foot 7 of the L-shaped member and engaging the squared upper end 5 of the finger 4, the disposition of these parts might be reversed although I prefer the arrangement shown because it prevents dirt and water from getting into the socket. It will be clear, however, that any other means for detachably connecting the removable portion of this step with the upright finger of the fixed member may be employed, and the removability of the outer part is obviously for the purpose of permitting the wheel to be withdrawn.

In practice the parts will doubtless be made of metal suitably treated or painted to prevent rust, the finger 4 may be sufficiently long to carry the foot 7 over the top of the largest wheel, and the member 6 may be quite long and provided with holes into which the foot pieces can be riveted or bolted at any desired point. The user buys an attachment and connects the plate with the axle and sand board as shown, cuts off the upper end of the finger 4 at the proper point, drops the socket 8 over it and marks and cuts off the lower end of the member 6 at a point above the bottom of the hub, and then attaches the foot pieces.

To remove the wheel the operator has but to grasp the foot 7 in his hand and pull the socket off the square portion of the finger and lay the entire outer member aside, and after he has greased the axle or repaired and replaced the wheel, this member can be replaced in an instant. If it should so happen that he intends to drive over a long stretch of muddy road, or even if he should approach a soft or muddy place in the road, the removable member of the step structure can be lifted off by reaching down as he sits on the seat; and of course he can take the device off and leave it at home at any time. Sooner or later his hub will strike something, and the disposition of the outer member of this step structure behind the hub causes the latter to protect it thoroughly as has been explained. If he should drive over a stump which the lower side of the hub barely clears, it could not strike the lower end of the member 6 or the lower foot piece. If he should drive alongside of an upright post or fence which the outer end of the hub barely passes, the step structure is protected. If his hub should be driven directly against a tree or stake, or even into contact with the hub of another vehicle, the step structure is still protected. This feature is an important detail of my invention because the nature of the device is such that from the lower foot piece 19 over the wheel to the plate which is bolted on the axle and sand board is considerable distance, and the impact of something against the outer member of the structure would be almost certain to break or bend it as will be clearly understood.

What is claimed as new is:

1. The herein described wagon step structure comprising an inner member adapted to be secured to the axle and having an upright finger inside the wheel, an outer member standing outside the wheel and passing over it and having a socket adapted to engage said finger, its body standing wholly in rear of an upright plane through the axle and hub, a foot piece secured to the lower end of this member and projecting to the rear behind and standing wholly above the bottom of said hub, and a second foot piece projecting forward from said member above the hub and terminating short of the front side thereof, both foot pieces and the outer member standing wholly inside a plane through the outer end of the hub at right angles to the above-mentioned plane.

2. The herein described step structure for attachment to farm wagons, the same comprising an inner member including a plate adapted to be secured to the axle and an upstanding rectangular finger, an outer member adapted to stand outside the wheel behind the hub and having a long threaded hole in its lower end and its upper end carried over the wheel and downward and provided with a rectangular socket adapted to removably engage said finger, a rear foot piece standing behind the hub and wholly inside its outer end and above its lower side, a screw passing upward through this foot piece and into said hole in the outer member, and a front foot piece adjustably mounted on said outer member above the hub and also standing wholly inside its outer end, the length of this foot piece being such that its forward extremity stands in rear of an upright line through the front side of the hub, for the purpose set forth.

In testimony whereof I affix my signature in presence of two witnesses.

AMON CORNELIUS SMITH.

Witnesses:
J. T. PATMAN,
WM. T. HAYTER.

Copies of this patent may be obtained for five cents each, by addressing the "Commissioner of Patents, Washington, D. C."